No. 854,633.  
PATENTED MAY 21, 1907.  
G. H. DARRINGTON.  
CLEVIS.  
APPLICATION FILED JAN. 29, 1907.
2 SHEETS—SHEET 1.
Fig_1_
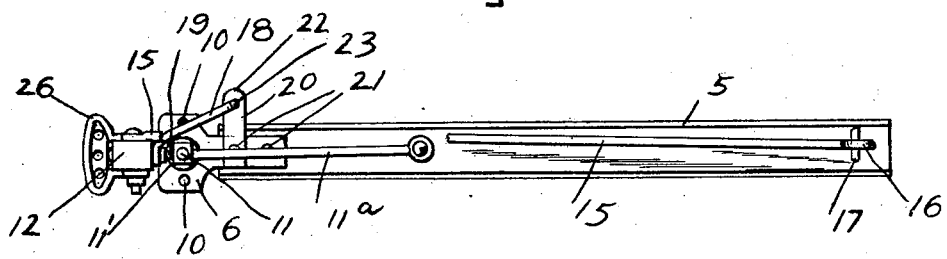
Fig_2_
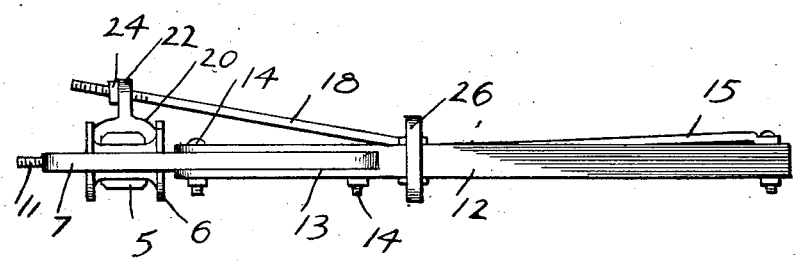
Witnesses  
W. T. Rockwell  
H. G. Smith
Inventor  
George H. Darrington  
By Chandler & Chandler  
Attorneys No. 854,633.
PATENTED MAY 21, 1907.
G. H. DARRINGTON.
CLEVIS.
APPLICATION FILED JAN. 29, 1907.
2 SHEETS—SHEET 2.
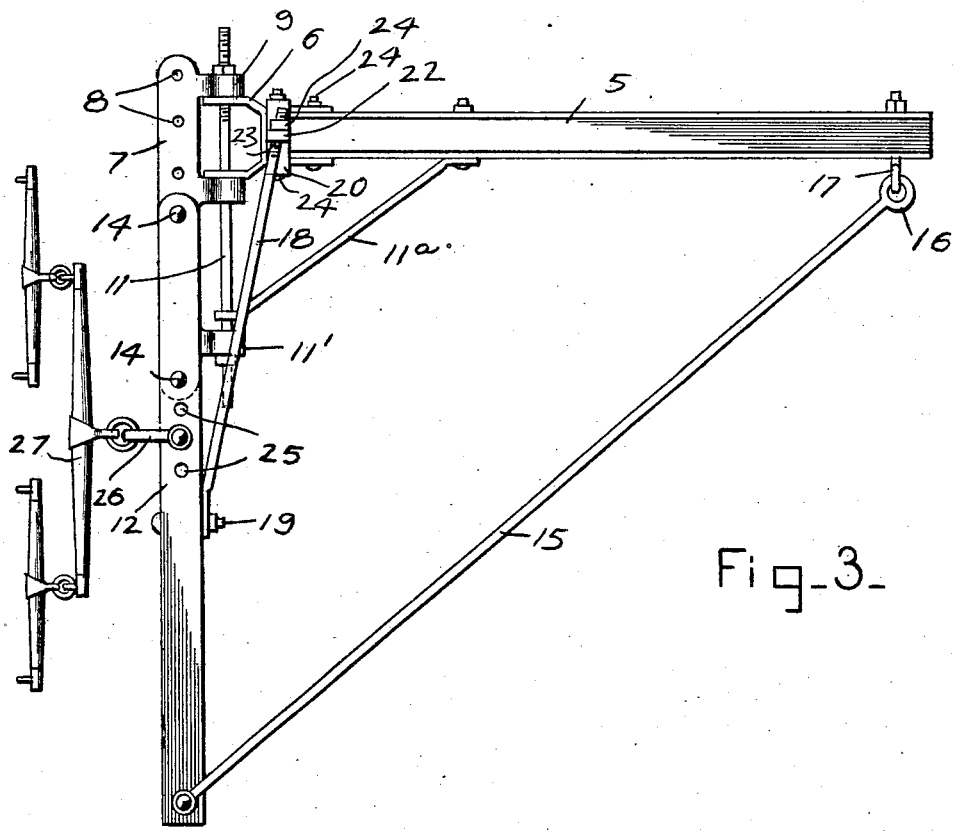
Fig_3_
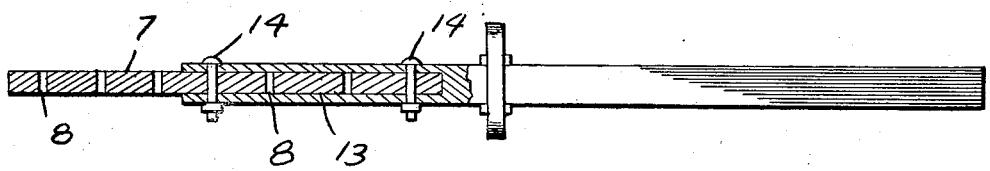
Fig_4_
Witnesses
Inventor
George H. Darrington
By
Attorneys

UNITED STATES PATENT OFFICE.

GEORGE H. DARRINGTON, OF HONEY CREEK, IOWA.

CLEVIS.

No. 854,633.

Specification of Letters Patent.

Patented May 21, 1907.

Application filed January 29, 1907. Serial No. 354,644.

*To all whom it may concern:*

Be it known that I, GEORGE H. DARRINGTON, a citizen of the United States, residing at Honey Creek, in the county of Pottawattamie, State of Iowa, have invented certain new and useful Improvements in Clevises; and I do hereby declare the following to be a full, clear, and exact description of the invention, such as will enable others skilled in the art to which it appertains to make and use the same.

This invention relates to plow clevises and has for its object to provide a clevis of such construction that four or more horses may be connected abreast therewith and the invention consists, broadly speaking, in a member which is adjustably connected with the plow clevis and to which is secured a beam for the attachment of a double-tree or other draft device. A brace bar is also connected with the beam just mentioned at the extreme outer end thereof and to the plow beam to brace the said bar against forward or rearward movement.

Another novel feature of my invention resides in the provision of a brace bar which is connected at one of its ends with a bracket connected with the clevis and at its opposite or lower end to the draft beam whereby preventing raising of the same due to the strain exerted upon it.

In the accompanying drawings, Figure 1 is a side elevation of my invention applied to a plow beam, Fig. 2 is a front elevation thereof, Fig. 3 is a top plan view, and, Fig. 4 is a detail vertical longitudinal sectional view through the member which is connected with the clevis and through the draft-beam which is connected with this member.

Referring more specifically to the drawings the numeral 5 denotes the beam of a plow and 6 the plow clevis.

A plate 7 which is provided with an equal number of openings 8 has formed a pair of ears 9 through which and interchangeably through the openings 10 in the clevis is engaged a bolt rod 11, it being understood of course that this plate extends horizontally whereas the clevis is disposed vertically. This bolt rod 11 is also engaged through a third ear 11' formed upon the plate 7 and an arm 11ª is secured to the beam 5 of the plow and is arranged at its forward end for the passage of the rod to aid in guiding and supporting the same. A draft beam 12 has its inner end bifurcated as at 13 and engaged with one of its spaced members, formed by the bifurcation, above the plate 7 and the other below. A pair of bolts 14 are engaged through the said members of the beam 12 and also through the openings 8, the said members being so spaced that they may be engaged through successive pairs of the bolt openings 8 in the plate 7. To the extreme outer end of this beam 12 is pivotally connected the forward end of a brace rod 15 and this rod is provided at its opposite end with an eye 16 which is engaged with an eyebolt 17 upon the beam 5 of the plow. This pivotal connection of the rod 15 with the draft beam 12 and the plow beam 5 serves to permit of the adjustment of the beam 12 as heretofore stated.

It will be understood that the brace rod 15 serves merely to prevent forward swinging of the beam 12 and in order to prevent raising of the outer end of the beam due to the pull exerted by the horses, a second brace rod 18 is provided and this rod is connected at its lower end by means of a bolt 19 with the beam 12. A clip or bracket 20 is engaged around the clevis 6 and is bolted thereto by means of one of the clevis bolts 21 and this clip or bracket includes an upwardly extending portion or arm 22 with which the upper end of the brace rod 18 is connected, the said rod for the purpose of this connection being screw threaded at its upper end and engaged through an opening 23 in the upstanding arm 22 and provided with a nut 24 which is adjustable to accommodate for the adjustment of the draft beam 12. This draft beam is provided with a plurality of openings 25 for the interchangeable engagement of a clevis 26 with which is connected a double-tree 27.

From the foregoing it will be seen that the draft beam 12 may be adjusted laterally with respect to the plate 7 and vertically by means of the said plate.

What is claimed is—

The combination with a plow beam and its clevis, of a plate adjustably connected with the clevis and provided with a plurality of openings, a draft beam having one of its ends bifurcated for the reception of the plate, bolts adjustably engaged through the bifurcated end of the beam and the plate, a brace rod pivotally connected with the end of the beam opposite its bifurcated end and with the plow beam, said rod being disposed in a horizontal plane, a bracket connected with the clevis by means of one of the clevis bolts, a brace rod secured to the draft beam at its lower end and inclined upwardly and engaged at its opposite end through an opening formed in the bracket, said end of the rod being threaded, and a nut engaged upon the rod, said draft beam being provided with a plurality of openings for the interchangeable engagement of a clevis bolt.

In testimony whereof, I affix my signature, in presence of two witnesses.

GEORGE H. DARRINGTON.

Witnesses:
CHRISTIAN PETERSON,
CHRISTENA DARRINGTON.